Jan. 12, 1960
H. R. FOSTER ET AL
2,921,268
WAVE GENERATING APPARATUS
Filed May 26, 1955
2 Sheets-Sheet 1
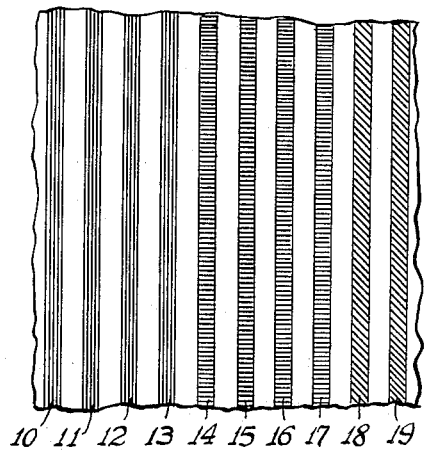
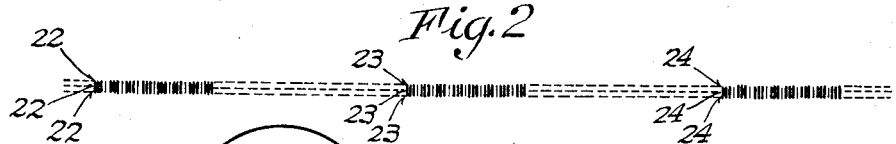
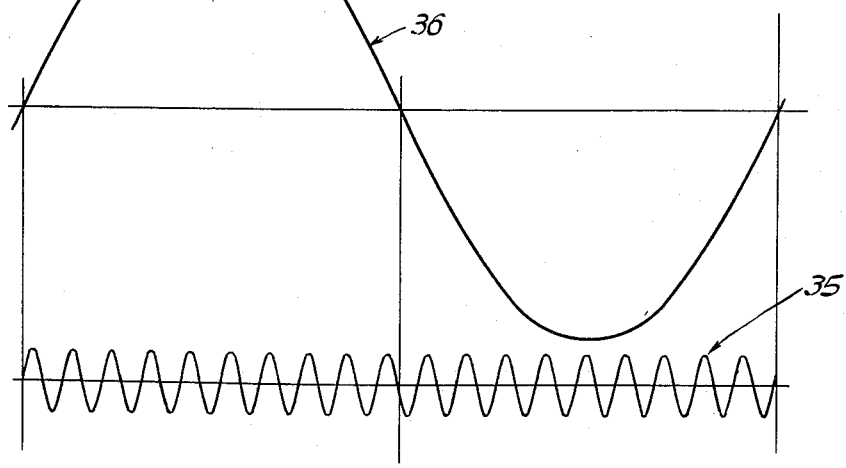
INVENTORS
Harry R. Foster
Elmo E. Crump
BY
Munn, Liddy, Nathanson & March
ATTORNEYS

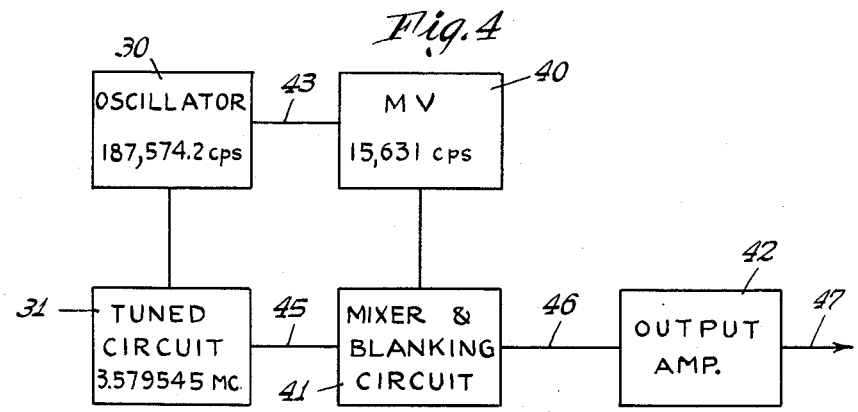
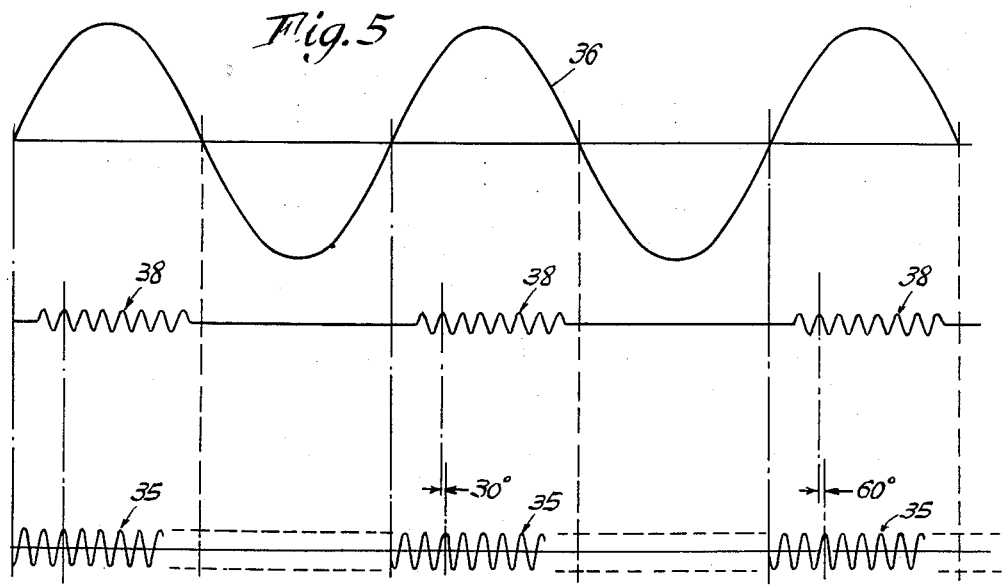
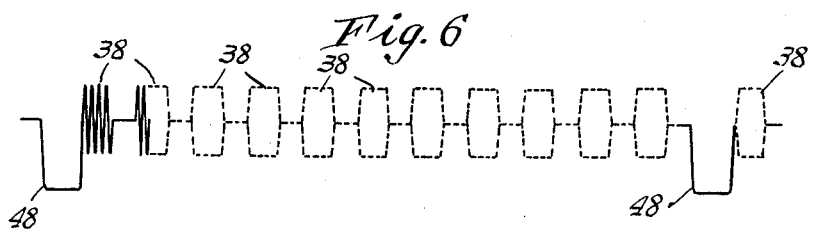

United States Patent Office 2,921,268
Patented Jan. 12, 1960

2,921,268

WAVE GENERATING APPARATUS

Harry R. Foster, Montville, and Elmo E. Crump, West Caldwell, N.J., assignors to Ohmega Laboratories, Pine Brook, N.J., a corporation of New Jersey Application May 26, 1955, Serial No. 511,372

9 Claims. (Cl. 331—55)

This invention relates to the generation of electrical waves, and more particularly to methods and means for generating waves which have utility especially in the testing of color television receivers.

The present application is a continuation in part of our copending application S.N. 431,525 filed May 21, 1954 now abandoned and entitled "Means for Generating Color Signals for TV Use."

An object of the invention is to provide an improved method and means for generating test waves capable of producing picture-tube or cathode-ray tube patterns which are useful for checking the color response and circuitry of television receivers.

Another object of the invention is to provide an improved method and apparatus as above set forth which is extremely simple, and in the case of the apparatus, reliable in its operation and relatively inexpensive to manufacture.

A feature of the invention resides in the provision of improved wave-generating apparatus as above set forth, which is relatively small and compact, and readily portable.

Another feature of the invention resides in the provision of wave-generating apparatus in accordance with the above, which does not easily get out of calibration or adjustment, and which may be used at various locations having the usual source of alternating current.

A still further object of the invention is to provide an improved wave-generating apparatus by which periodic, uniform, wave trains of predetermined occurrence are produced, each of said trains being progressively more phased-displaced with respect to a time base or reference wave having the same frequency as the wave train; in other words, the waves of each train have a predetermined, fixed, phase-displacement with respect to a time base predicated on the waves of the preceding train.

Another object of the invention is to provide an improved adjustable wave-generating apparatus producing periodic wave trains wherein succeeding peaks of the train may have different phase displacements with respect to a predetermined time base or reference wave, and wherein adjustment of the apparatus enables said phase displacements to be varied at will.

Yet another object of the invention is to provide a wave-generating means by which periodic trains are produced in accordance with the above, said trains having a substantially uniform or constant duration.

A still further object of the invention is to provide an improved method and means for generating a test wave for color television equipment, by which a plurality of differently colored bars may be made to appear on the television screen in a regular order, the different colors appearing in succession according to a predetermined plan.

Other features and advantages will hereinafter appear.

In the accompanying drawings:

Fig. 1 is a diagrammatic showing of the colored bars which appear on the face of a TV picture tube, as provided by the apparatus and method of the invention.

Fig. 2 is a fragmentary view, greatly enlarged, showing a portion of the TV screen having colored areas occurring in each horizontal line and registering to produce the colored bars of Fig. 1.

Fig. 3 is a diagram showing the normal output waves of two circuits forming portions of the wave-generating apparatus of the invention.

Fig. 4 is a block diagram of the apparatus of the invention.

Fig. 5 is a diagram showing a resultant wave having color bursts which are produced when the circuits of Fig. 4 are connected and influenced one by the other.

Fig. 6 is a diagram showing an output wave form of the apparatus of Fig. 4.

The improved wave-generating apparatus and method of the present invention, in the embodiment thereof illustrated herein, generates a signal which, when applied to a color television receiver, produces colored bars numbered 10 to 19 on the screen of the receiver, as shown in Figs. 1 and 2. The bars 10–19 are ten in number, and may comprise different shades of different colors. For example, the bars 10, 11, 12, and 13 may be different shades of red, the bars 14, 15, 16 and 17 may be shades of blue, and the bars 18 and 19 may be shades of green. The bars 10–19 are produced by a plurality of short, horizontal color areas, such as areas 22, 23, and 24 shown in Fig. 2, there being ten such areas in each horizontal scanning line of the frame. The areas 22, 23 and 24 may be different shades of red, for example, which when arranged in registration in the proper columns will make up the bars 10, 11 and 12. Likewise the remaining seven color areas in each scanning line when registered, constitute the remaining bars 13–19.

In accordance with the present invention an improved and simplified apparatus and method are provided by which the bars 10–19 may be readily produced in a television receiver for testing purposes. In the present instance where the vertical colored bars 10–19 are to be produced on the TV screen in shades of different colors occurring in succession from left to right, it will be seen that the red areas 22, 23, 24 and so on in the various horizontal scanning lines must occur substantially in vertical registration with each other. Each colored area 22, 23, 24 etc. is produced by a burst or wave train impressed on the TV receiver, having a wave form with approximately the frequency 3.579545 mc. which is the color subcarrier frequency. Whether the colored area which is produced is one shade or color or another depends on the phase position of the 3.579545 mc. burst, and we have found that by shifting the phase positions of the bursts 30 degrees progressively with respect to a time base having the frequency of the burst wave form the shades and colors indicated above may be advantageously produced. In order for all of the areas 22 to be of the same color or shade they must be in phase or have the same phase position, and this is accomplished according to the present invention by the provision of the 30 degree phase shift between succeeding color areas in a line and by providing twelve color bursts in each line or horizontal synchronizing period, so that the total phase shift between any adjacent, vertically registering areas 22, 23 etc. of any color bar is 360 degrees.

In accomplishing the above, by the present invention, there is provided as shown in Fig. 4 an oscillator 30 and a triggered circuit 31 under the control of the oscillator. The oscillator 30 may be termed a keyed oscillator and may be crystal-controlled or controlled in any other suitable manner. The circuit 31 may be an oscillator, tuned regenerative amplifier circuit or a ringing circuit, and these oscillator circuits are so connected that one triggers or keys the other to provide therefrom bursts or wave trains of proper frequency and phase position to produce the desired signal described above. The circuit 31 may have a normal frequency of 3.579545 mc., and if properly controlled may produce trains having wave forms of this frequency to excite the TV receiver so that various colors and shades may be produced on the screen of the picture tube.

As above stated, to obtain the color bars 10–19 shown in Fig. 1 by means of the color areas shown in Fig. 2, twelve bursts or wave trains phase shifted progressively 30°, 60°, 90° and so on with respect to the color subcarrier frequency are made to occur for each horizontal synchronizing pulse. The horizontal synchronizing frequency being 15,750 c.p.s., if the color subcarrier frequency of 3.579545 mc. is divided by the horizontal synchronizing frequency of 15,750 c.p.s. it will reveal that for each horizontal synchronizing period there would occur 227.2 cycles of the color subcarrier frequency. If each horizontal synchronizing period representing 227.2 cycles of the color subcarrier is divided into twelve parts, corresponding to the number of 30° phase shifted color bursts or trains, each 1/12 part of the horizontal synchronizing period would correspond to 18.9 or approximately 19 cycles of the subcarrier. Since it is desired that each succeeding color burst or train having the subcarrier frequency be phase displaced or shifted by 30 degrees or 1/12 of a cycle from the preceding train to produce the color areas 22, 23, 24 etc. in progressing colors or shades, and considering the 1/12 interval of a horizontal synchronizing period as representing 19 cycles of the subcarrier, we add 1/12 cycle (or subtract 1/12 cycle) from the 19 cycle figure, producing in the case of addition, an interval of 19 1/12 cycles. This, then, will result in a progressive phase shift of substantially 30 degrees. In Figs. 3 and 5 the subcarrier wave 35 of 3.579545 mc. is shown as divided into intervals of 19 1/12 cycles, and if each interval were to correspond to a color burst, the frequency or rate of occurrence of the color bursts would be 3.579545 mc. divided by 19 1/12 (or 18 11/12 if the 12th is subtracted from 19 instead of added). This will give, as the frequency or rate of occurrence of the color bursts, 187,574.2 c.p.s. The keying oscillator 30 is so arranged that it has this frequency of 187,574.2 c.p.s. From this figure we may then calculate a revised horizontal synchronizing frequency, for use with the 30° phase-shifted color burst, as follows:

$$\frac{187{,}574.2}{12} = 15631 \text{ c.p.s.}$$

Another way of arriving at the integer 19 (19 cycles of the subcarrier) is as follows:

If twelve color bursts are provided in each horizontal synchronizing period with a 30° phase shift of the wave form from burst to burst, the process may complete itself in each line (12×30 degrees phase shift=360 degrees total shift), the 13th burst being then in phase with the first and the time between bursts, T, being $$\frac{1}{15{,}750 \times 12}$$

(since the duration, $t$, of a cycle of the subcarrier is $$\frac{1}{3.579 \times 10^6})$$

Dividing T by $t$, we obtain:

$$\frac{T}{t} = \frac{3.579545 \times 10^6}{15750 \times 12}$$

The value of this is approximately 18.9 or slightly less than 19. This may be fixed at 19 and adjustment made of the horizontal synchronizing frequency to provide for vertical registration of the color areas 22, 23, 24 etc. If the horizontal synchronizing frequency is $f_h$ then $$\frac{1}{f_h} = 12(19\tfrac{1}{12} \times 1/3.579)$$

$$f_h = \frac{3.579}{12(19) \text{ plus } 1} = 3.579 \text{ divided by 229 or } 15{,}631$$

The adjusted horizontal synchronizing frequency may then have this value of 15,631 c.p.s.

In Fig. 3 an output wave 36 is shown, such as may be produced by the oscillator 30, and this oscillator is connected as shown in Fig. 4 to key or trigger the oscillator or circuit 31. The result is shown in Fig. 5 wherein the upper curve 36 represents the keying frequency of 187,574.2 c.p.s. The lower curve 35 is shown in fragmentary expanded portions, and has the color subcarrier frequency of 3.579545 mc., being the normal frequency of the circuit 31. As a consequence of keying the tuned or ringing circuit 31 by the oscillator 30, color trains are obtained, occurring 187,574.2 times a second or twelve times in each horizontal synchronizing period. Further, each color burst has a frequency of 3.579545 mc. and the wave form thereof is phase-displaced 30 degrees from the wave form of the succeeding color burst, so that after twelve of the color bursts have occurred the 13th color burst will be substantially again in phase with the first color burst, actually having been displaced a full 360 degrees. Each of the color bursts 38 has a duration of approximately eight cycles, and the phase shifts of the succeeding color bursts are indicated in Fig. 5. For the sake of convenience of illustration the waves 35 and 38 are shown greatly expanded along their horizontal axis in Fig. 5. It will be understood, however, that actually for each cycle of the wave 36 there occurs 19 1/12 cycles of the wave 35, as shown in Fig. 3.

The output of the circuit 31, comprising the color bursts 38, may be combined with that of a synchronizing pulse generator in which event eleven bursts 38 will occur between each horizontal synchronizing pulse, to produce the pattern on the TV screen shown in Figs. 1 and 2. The combined wave is shown in Fig. 6.

The block diagram of Fig. 4 illustrates the apparatus of the invention by which the waves are produced and combined. In this figure, a multivibrator 40 is provided, a mixer and blanking circuit 41, and also an output amplifier 42. The oscillator 30 is connected as shown at 43 to control the frequency of the multivibrator 40, and the output 44 of the multivibrator is fed to the mixer and blanking circuit 41. The output 45 of the tuned circuit 31 is also fed to the mixer and blanking circuit 41 whose output, indicated at 46, is brought to the amplifier 42. The output of the amplifier 42, indicated at 47, may be impressed on the TV receiver.

As shown in Fig. 5, the circuit 31 is preferably set oscillating, or "turned on" so to speak by an output potential which is only a small fraction of the magnitude of the wave 36, and each wave train 38 preferably persists for an interval slightly less than that of the associated positive half wave (of the wave 36).

However, the circuitry may be such that circuit 31 could respond to larger values of input potential, obviously, and the duration of the wave trains 38 might be different from the interval mentioned. The trains 38 might have long durations and short "off" intervals, or vice versa.

In Fig. 6 the color bursts or wave trains 38 are shown in conjunction with horizontal synchronizing pulses 48, and this wave form may be observed in the output 46 of the mixer and blanking circuit 41. One of the color bursts 38 is obliterated by the horizontal synchronizing pulse 48, and the succeeding color burst 38 does not appear on the TV screen for the reason that it is utilized in the receiver by the comparison and locking circuits, to establish a reference. This second or succeeding color burst 38 may thus be thought of as a reference burst. The remaining ten color bursts are evidenced as the ten color bars 10–19 shown in Fig. 1.

Different types of television receivers have different phase-shifting circuits, and accordingly it may be of advantage to include in the color bursts a wave portion which is phase-displaced 33 degrees, for example, for use with receivers having 33-degree phase shifting circuits. Receivers having 90 and 180 degree phase shifting circuits may utilize the 30 degree phase-displaced color bursts described above.

By the present invention we provide color bursts or wave trains which may have different phase displacements, by changing slightly the frequency of the circuit 31. This frequency given as 3.579545 mc., may be 3.58 mc. or may have other values, and by such adjustment of the color subcarrier frequency a color burst wave may at the start be phase-displaced 30 degrees and may progressively shift so that the end of the color burst or wave train may have a 35 degree phase-displaced relation. Accordingly, some portion of the wave train will have exactly a 33 degree phase displacement, and this portion will then be utilized by the 33 degree phase shifting circuit of the television receiver, to provide the desired test patterns.

The wave 36 shown in Figs. 3 and 5 is illustrated as being a sine wave; however it should be understood that other wave shapes may be employed, and the output of the oscillator 30 is thus not limited to a particular type of wave.

While the wave-generating apparatus and method described herein are shown in conjunction with the producing of test signals for use with color television receivers, it should be understood that the invention is not limited to this particular application but instead has utility generally in connection with the production of timed wave trains each constituting a number of cycles of a wave of given frequency, the trains occurring at intervals slightly different from a multiple of the period of said frequency, said difference comprising a fraction constituted of 1 divided by a small integer whereby the wave forms of succeeding trains are progressively phase shifted.

It will be seen that by the above organization we have provided a novel and improved, simplified and advantageous apparatus and method by which phase-displaced color bursts may be produced for use with a TV receiver to provide the color bars 10–19 shown in Figs. 1 and 2, for purposes of checking the receiver. The apparatus is relatively small and compact, comparatively inexpensive to produce, and may be used wherever a suitable source of current is available for energization of the circuits.

We claim:

1. Apparatus for producing an electrical wave having periodic, recurring wave trains the waves of which are progressively phase-displaced, comprising a tuned and energized circuit tuned and adapted normally to produce a wave having a frequency on the order of said wave trains when its input is energized with a suitable unidirectional pulse of given polarity, said circuit including means for rendering it inoperative to produce said wave when its input is energized with a suitable pulse of opposite polarity; and means for keying said circuit periodically on and off, said means applying to the said input of the circuit a fluctuating potential containing said pulses in alternation and having a frequency which is close to but different from a submultiple so related to the frequency of the tuned circuit, thereby to cause the said phase displacement.

2. Apparatus for producing an electrical wave having periodic, recurring wave trains, comprising means for generating a fluctuating potential containing pulses of reverse polarity in alternation and having a frequency equal to the recurrence frequency of said wave trains; a tuned and energized circuit tuned and adapted normally to produce a wave having a frequency on the order of said wave trains when its input is energized with a suitable unidirectional pulse of given polarity, said circuit including means for rendering it inoperative to produce said wave when its input is energized with a suitable pulse of opposite polarity, the frequency of said fluctuating potential being close to but different from a submultiple of the frequency of said tuned circuit; and means for impressing said fluctuating potential on the input of said tuned circuit whereby the latter is periodically activated and inactivated to key it in step with said potential, thereby to provide the said electrical wave.

3. The invention as defined in claim 2 in which the frequency of the said fluctuating potential is related to the frequency of the wave trains by a factor constituted of an integer plus a rational fraction.

4. The invention as defined in claim 3 in which the denominator of the fraction is 12.

5. The invention as defined in claim 2 in which the frequency of the fluctuating potential is in the kilocycle range and the frequency of the wave of the wave trains is in the megacycle range.

6. The invention as defined in claim 2 in which the frequency of the fluctuating potential is approximately 187.6 kc. and the frequency of the wave of the wave trains is approximately 3.58 mc.

7. Apparatus for producing a TV test wave having horizontal synchronizing pulses and periodic, recurring wave trains occurring between said pulses, comprising means for generating a fluctuating potential containing pulses of reverse polarity in alternation and having a frequency equal to the recurrence frequency of said wave trains; a tuned and energized circuit tuned and adapted normally to produce a wave having a frequency on the order of said wave trains when its input is energized with a suitable unidirectional pulse of given polarity, said circuit including means for rendering it inoperative to produce said wave when its input is energized with a suitable pulse of opposite polarity, the frequency of said fluctuating potential being close to but different from a submultiple of the frequency of said tuned circuit; means for impressing said fluctuating potential on the input of said tuned circuit whereby the latter is periodically activated and inactivated to key it in step with said potential, thereby to provide the said electrical wave; a synchronizing pulse generator; means locking said pulse generator and potential generating means together; and means combining the outputs of said pulse generator and tuned circuit to provide the said electrical wave.

8. The invention as defined in claim 7 in which the frequency of the pulse generator is a submultiple of the frequency of said fluctuating potential.

9. The invention as defined in claim 7 in which the frequency of the pulse generator is a submultiple of the frequency of said fluctuating potential and in which the frequency of the said fluctuating potential is related to the frequency of the wave trains by a factor constituted of an integer plus a fraction.

References Cited in the file of this patent
UNITED STATES PATENTS

| | | |
|---|---|---|
| 2,495,115 | Mayer | Jan. 17, 1950 |
| 2,580,083 | Doba et al. | Dec. 25, 1951 |
| 2,617,034 | Hepp | Nov. 4, 1952 |
| 2,679,005 | Bataille et al. | May 18, 1954 |
| 2,712,064 | Gillette et al. | June 28, 1955 |

OTHER REFERENCES

Article: WR–61A Color-Bar Generator; copyright 1954 by RCA.

Rainbow Generator by Winslow Starkes, pages 79–81 of Test Instruments for T.V., for January 1955, class 178 testing.